(12) United States Patent
Chatzigeorgiou et al.

(10) Patent No.: US 9,285,290 B2
(45) Date of Patent: Mar. 15, 2016

(54) LEAK DETECTION APPARATUS

(71) Applicant: Massachusetts Institute of Technology, Cambridge, MA (US)

(72) Inventors: Dimitrios Chatzigeorgiou, Somerville, MA (US); Samir Mekid, Dharhan (SA); Rached Ben-Mansour, Dhahran (SA); Atia Khalifa, Dhahran (SA); Kamal Youcef-Toumi, Cambridge, MA (US)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 261 days.

(21) Appl. No.: 14/072,205

(22) Filed: Nov. 5, 2013

(65) Prior Publication Data

US 2014/0130577 A1  May 15, 2014

Related U.S. Application Data

(60) Provisional application No. 61/725,566, filed on Nov. 13, 2012, provisional application No. 61/818,479, filed on May 2, 2013.

(51) Int. Cl.
   *G01M 3/08*     (2006.01)
   *G01M 3/28*     (2006.01)
   *G01M 3/18*     (2006.01)

(52) U.S. Cl.
   CPC ............. *G01M 3/2815* (2013.01); *G01M 3/18* (2013.01)

(58) Field of Classification Search
   CPC .............................. G01M 3/18; G01M 3/2815

USPC .......... 73/23, 28, 31, 49; 204/408, 412, 421, 204/431; 324/693
See application file for complete search history.

(56) References Cited

U.S. PATENT DOCUMENTS

| | | | | |
|---|---|---|---|---|
| 3,508,433 | A * | 4/1970 | Bustin | F16L 55/28 73/40.5 A |
| 5,359,939 | A * | 11/1994 | Watt | G01M 3/005 104/138.2 |
| 7,143,659 | B2 * | 12/2006 | Stout | F17D 5/00 324/71.2 |
| 7,523,666 | B2 * | 4/2009 | Thompson | G01M 3/246 73/592 |
| 2002/0148294 | A1 | 10/2002 | Bond | |
| 2007/0289635 | A1 | 12/2007 | Ghazarian et al. | |
| 2011/0298609 | A1 * | 12/2011 | Mekid | G06K 19/0776 340/539.1 |

(Continued)

OTHER PUBLICATIONS

Dimitris et al., Analysis and Design of an In-Pipe System for Water Leak Detection.pdf,Aug. 2011,IDETC/CIE 2011,pp. 1-10.*

(Continued)

*Primary Examiner* — John Fitzgerald
*Assistant Examiner* — Gedeon M Kidanu
(74) *Attorney, Agent, or Firm* — San Pasternack; MIT Technology Licensing Office (57) ABSTRACT

Leak detection apparatus for deployment in a pipe. The apparatus includes a carrier disposed for motion along the pipe and a detector connected to move with the carrier in an axial direction. The detector comprises a drum mounted for rotation about pitch and yaw axes. A flexible material is mounted on, and extends from, the drum and at least two sensors responsive to drum rotation are provided. The flexible material will be drawn into contact with a wall of the pipe at a leak location, thereby producing a torque on the drum, causing the drum to rotate, and the at least two sensors to generate signals from which leak location is determined.

3 Claims, 8 Drawing Sheets

(56) References Cited

U.S. PATENT DOCUMENTS

| | | | | |
|---|---|---|---|---|
| 2012/0204624 A1* | 8/2012 | El Ferik | ............... | G01M 3/005 73/40.5 R |
| 2012/0272722 A1* | 11/2012 | Khalifa | ............... | G01M 3/2823 73/40.5 R |
| 2012/0273078 A1* | 11/2012 | Hawwa | ............... | F16L 55/163 138/98 |
| 2012/0285221 A1* | 11/2012 | Al-Qahtani | ............ | G01M 3/246 73/40.5 A |

OTHER PUBLICATIONS

Mays L., Water Distribution Systems Handbook, 2000, McGraw-Hill, US.

Hunaidi O. et al., Leak detection method for plastic water distribution pipes, Advancing The Science of Water, Fort Lauderdale Technology Transfer Conference, AWWA Research Foundation, 1999, pp. 249-270, US.

Fuchs H.V. et al., Ten years of expertise with leak detection by acoustic signal analysis, Applied Acoustics, 1991, pp. 1-19, vol. 33, US.

Hunaidi O. et al., Acoustical characteristics of leak signals in plastic water distribution pipes, Applied Acoustics, 1999, pp. 235-254, vol. 58, US.

Bracken M. et al., Practical aspects of acoustical leak location on plastic and large diameter pipe, Leakage 2005 conference Proceedings, 2005, pp. 448-452, US.

Hunaidi O. et al., Detecting leaks in plastic pipes, Journal American Water Works Association, 2000, pp. 82-94, vol. 92 No. 2, US.

Hunaidi O. et al., Ground-penetrating radar for detection of leaks in buried plastic water distribution pipes, Seventh International Conference on Ground Penetrating Radar, 1998, pp. 783-786, US.

Kurtz D.W., Developments in a free-swimming acoustic leak detection system for water transmission pipelines, ASCE Conference Proceedings, 2006, US.

Bond A. et al., Pinpointing leaks in water transmission mains, Pipeline Engineering and Construction, 2004, pp. 1-10, vol. 91 No. 146, American Society of Civil Engineers, US.

Chatzigeorgiou D. et al., Analysis and design of an in-pipe system for water leak detection, ASME International Design Engineering Technical Conferences & Design Automation Conference, 2011, US.

Khalifa A. et al., Quantifying acoustic and pressure sensing for in-pipe leak detection, ASME International Mechanical Engineering Congress & Exposition, 2010, US.

Chatzigeorgiou D. et al., An in-pipe leak detection sensor: Sensing capabilities and evaluation, ASMEIJEEE International Conference on Mechatronic and Embedded Systems and Applications, 2011, US.

Choi H-R. et al., Differential-drive in-pipe robot for moving inside urban gas pipelines, Transactions on Robotics, 2005, vol. 21 No. 1, US.

Schempf H. et al. Explorer: Untethered real-time gas main assessment robot system, Proceedings of International Workshop on Advances in Service Robotics, 2003, US.

Mirats Tur J.M. et al, Robotic devices for water main in-pipe inspection: A survey, Journal of Field Robotics, 2010, pp. 491-508, vol. 27 No. 4, US.

Wu D. et al, Relay node placement in wireless sensor networks for pipeline inspection, IEEE American Control Conference, 2013, US.

Ben-Mansour R. et al, A computational fluid dynamic simulation of small leaks in water pipelines for direct leak pressure transduction, Computer and Fluids, 2012, US.

International Search Report PCT/US2013/069652 mailed on Mar. 28, 2014.

\* cited by examiner

*PipeGuard*

LEAK DETECTION APPARATUS

This application claims priority to provisional application Ser. No. 61/725,566, filed on Nov. 13, 2012 and to provisional application Ser. No. 61/818,479, filed on May 2, 2013, the contents of both of which are incorporated herein by reference.

BACKGROUND OF THE INVENTION

This invention relates to leak detection and more particularly to a leak detection apparatus based on the presence of a pressure gradient near a leak within a pipe.

Potable water obtained through access of limited water reserves followed by treatment and purification is a critical resource to human society. Failure and inefficiencies in transporting drinking water to its final destination wastes resources and energy. In addition to that, there are thousands of miles of natural gas and oil pipelines around the globe that are poorly maintained. Thus, a significant portion of the total oil and natural gas production is lost through leakage. This is causing, among others, threats for humans and environmental damage.

There are various out of pipe techniques reported in the literature for leak detection [1, 2]. First, leak losses can be estimated from audits. For instance in the water industry, the difference between amounts of water produced by the water utility and the total amount of water recorded by water usage meters indicates the amount of unaccounted water. While this quantity gives a good indication of the severity of water leakage in a distribution network, metering gives no information about the locations of the leaks.

Acoustic leak detection is normally used not only to identify but also to locate leaks. Acoustic methods consist of listening rods or aquaphones. These devices make contact with valves and/or hydrants. Acoustic techniques may also include geophones to listen for leaks on the ground above the pipes [2]. Drawbacks of those methods include the necessary experience needed by the operator. The method is not scalable to the network range since the procedure is very slow.

More sophisticated techniques use acoustic correlation methods, where two sensors are placed on either side of the leak along a pipeline. The sensors bracket the leak and the time lag between the acoustic signals detected by the two sensors is used to identify and locate the leak [3]. This cross-correlation method works well in metal pipes. However, a number of difficulties are encountered in plastic pipes and the effectiveness of the method is doubtful [4, 5].

Finally, several non-acoustic methods like infrared thermography, tracer gas technique and ground-penetrating radar (GPR) have been reported in the literature of leak detection [6, 7]. Those methods have the advantage of being insensitive to pipe material and operating conditions. Nevertheless, a map of the network is needed, user experience is necessary and the methods are in general slow and tedious.

Past experience has shown that in-pipe inspection is more accurate, less sensitive to external noise and also more robust, since the detecting system will come close to the location of the leaks/defects in the pipe. Various in-pipe leak detection approaches will now be discussed.

The Smartball is a mobile device that can identify and locate small leaks in liquid pipelines larger than 6" in diameter constructed of any pipe material [8]. The free-swimming device consists of a porous foam ball that envelops a watertight, aluminum sphere containing the sensitive acoustic instrumentation.

Sahara is able to pinpoint the location and estimate the magnitude of the leak in large diameter water transmission mains of different construction types [9]. Carried by the flow of water, the Sahara leak detection system can travel through the pipe. In case of a leak, the exact position is marked on the surface by an operator who is following the device at all times. Both Smartball and Sahara are passive (not actuated) and cannot actively maneuver inside complicated pipeline configurations. Last, operator experience is needed for signal extraction and leakage identification and localization.

Our group at the Massachusetts Institute of Technology has proposed a passive inspection system for water distribution networks using acoustic methods [10]. This detection system is designed to operate in small pipes (4"). The merits of the in-pipe acoustic leak detection under different boundary conditions are reported in [11, 12].

Under some circumstances it is easier to use remote visual inspection equipment to assess the pipe condition. Different types of robotic crawlers have been developed to navigate inside pipes. Most of these systems utilize four-wheeled platforms, cameras and an umbilical cord for power, communication and control, e.g. the MRINSPECT [13]. Schemph et al. report on a long-range, leak-inspection robot that operates in gas-pipelines (the Explorer robot) [14]. A human operator controls the robot via wireless RF signals and constantly looks into a camera to search for leaks. Such systems are suitable for gas or empty liquid pipelines (off-line inspection).

In the oil industry several nondestructive testing methods are used to perform pipe inspections. Most systems use Magnetic Flux Leakage (MFL) based detectors and others use ultrasound (UT) to search for pipe defects [15]. These methods' performance depends on the pipe material. They are also power demanding, most of the times not suitable for long-range missions and have limited maneuvering capabilities because of their large sizes.

An object of the present invention is an apparatus to perform autonomous leak detection in pipes that eliminates the need for user experience.

SUMMARY OF THE INVENTION

The leak detection apparatus for deployment in a pipe according to the invention includes a carrier disposed for motion along the pipe, and a detector connected to move with the carrier in an axial direction. The detector includes a drum mounted for rotation about pitch and yaw axes and a flexible material is mounted on and extends from the drum. At least two sensors are provided responsive to drum rotation. The flexible material will be drawn into contact with a wall of the pipe at a leak location, thereby producing a torque on the drum, causing the drum to rotate and the at least two sensors to generate signals from which leak location is determined.

In a preferred embodiment, the leak detection apparatus further includes a gimbal disposed between the carrier and detector to allow for drum rotation. A suitable flexible material is polyurethane.

The present invention achieves leak detection based on the presence of a pressure gradient in the neighborhood of a leak. The disclosed leak detector can sense leaks at any angle around the circumference of the pipe with only two sensors.

BRIEF DESCRIPTION OF THE DRAWING

FIGS. 4a, b, c and d are cross-sectional views of a pipe with a detector, according to an embodiment the invention, disposed inside.

FIGS. 5 A and B are perspective and cross-sectional views of a three dimensional solid model embodiment of the leak detector disclosed herein.

FIGS. 6 a,b,c,d,e,f,g and h is an exploded view of an embodiment of the leak detector disclosed herein.

FIGS. 7 A and B is a perspective and cross-sectional view illustrating forces acting on the drum in the presence of a leak.

FIGS. 8 A and B are top and bottom views of the leak detector disclosed herein deployed within a pipe according to an embodiment of the invention.

FIGS. 9 A, B and C is a perspective view of a three dimensional solid model of the carrier module of the leak detector disclosed herein according to an embodiment of the invention.

DESCRIPTION OF THE PREFERRED EMBODIMENT

Figures 1, 1A:
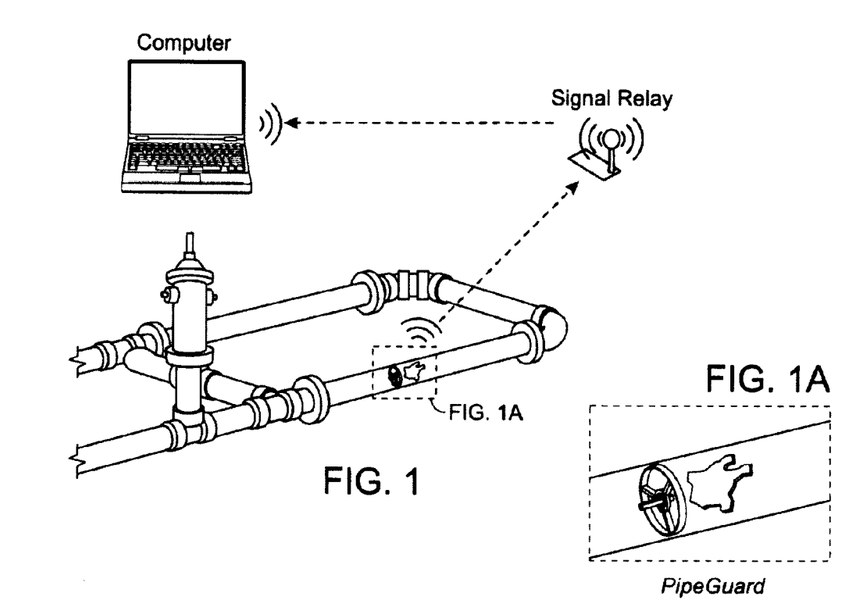
FIGS. 1 and 1A is a schematic, perspective view of an embodiment of the in-pipe leak detection apparatus disclosed herein.

In this application we introduce PipeGuard, a name adopted by the inventors herein for a new system able to detect leaks in pipes in a reliable and autonomous fashion (FIG. 1). The idea is that the apparatus disclosed herein is inserted into the network via special insertion points, e.g., fire hydrants in water networks. The system inspects the network and sends signals wirelessly via relay stations to a computer [16]. Leak signals stand out clearly on occurrence of leaks, eliminating the need for user experience. The latter is achieved via a detector that is based on identifying a clear pressure gradient in the vicinity of leaks.

The proposed detection concept and the proposed detector design are now discussed. PipeGuard is able to detect leaks in a reliable and robust fashion because of the fundamental principle behind detection. More specifically, the detection principle is based on identifying the existence of a localized pressure gradient $\partial p/\partial r$ This pressure gradient appears in pressurized pipes in the vicinity of leaks and is independent of pipe size and pipe material. It also remains relatively insensitive to the fluid medium inside the pipes, which makes the detection method widely applicable (gas, oil, water pipes, etc).

Figure 2:
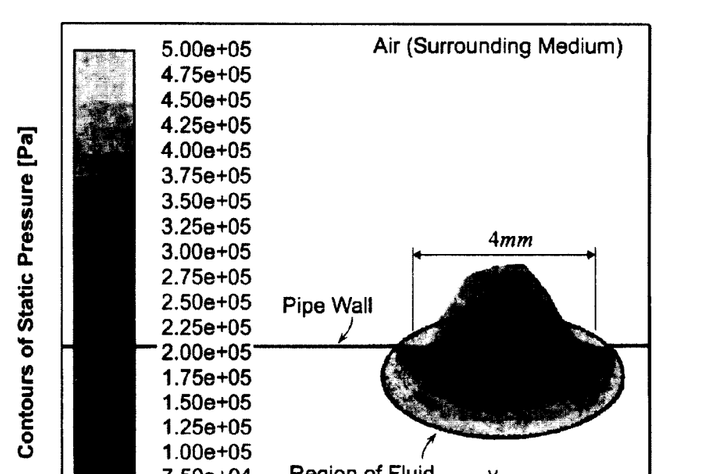
FIG. 2 is a chart illustrating a numerical study of the static pressure distribution in the vicinity of a leak in a water pipe.

The detection concept is based on the fact that any leakage in a pipeline alters the pressure and flow field of the working medium. Our group studied, characterized and quantified the phenomenon in detail [17]. The main conclusion is that the region near the leak that is affected is small. This region is characterized by a rapid change in static pressure, dropping from PHigh, inside the pipeline, to PLow in the surrounding medium outside (FIG. 2).

Figure 3:
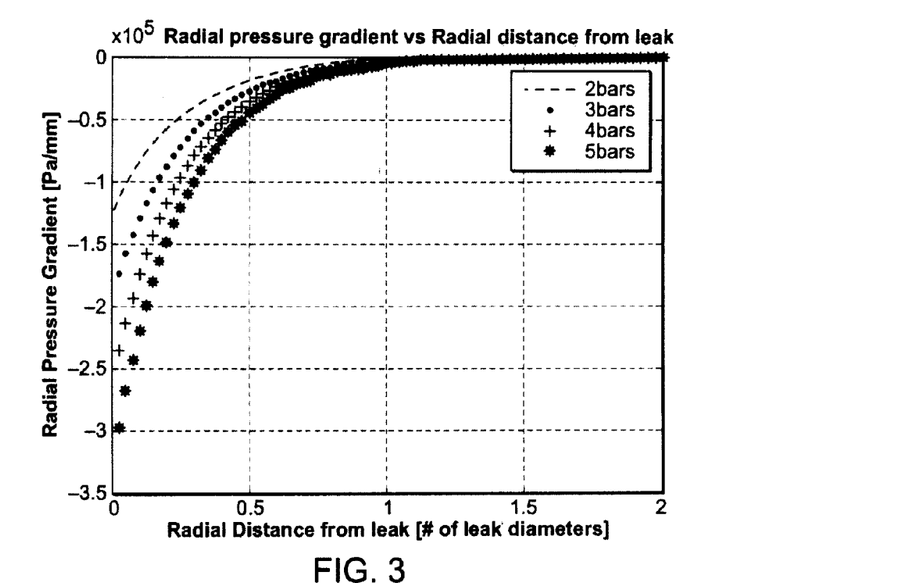
FIG. 3 is a graph of radial pressure gradient against radial distance in the vicinity of a 4 mm diameter leak.

This local phenomenon is an important feature in the disclosed leak detection scheme. The rapid change in pressure (radial pressure gradient) due to existence of leaks essentially represents a "suction region". Numerical studies showed that the radial pressure gradient close to the leak is large in magnitude ($O(\Delta p = p_{High} - p_{Low})$) and drops quickly as distance increases. This is shown in FIG. 3. More details are reported in [17].

Identifying leaks based on this radial pressure gradient proves to be reliable and effective as shown in this paper. Directly measuring the pressure at each point in order to calculate the gradient is not effective and should be avoided. However, as a leak can happen at any angle around the circumference, full observability would require a series of pressure sensors installed around the circumference of the pipe. To avoid the complexity of such an attempt, we introduce a more efficient mechanism to be discussed below.

We propose a detection concept for the identification of the radial pressure gradient in case of leaks. The main requirement is that the system should be able to detect leaks at any angle φ around the circumference of the pipe.

Figure 4:
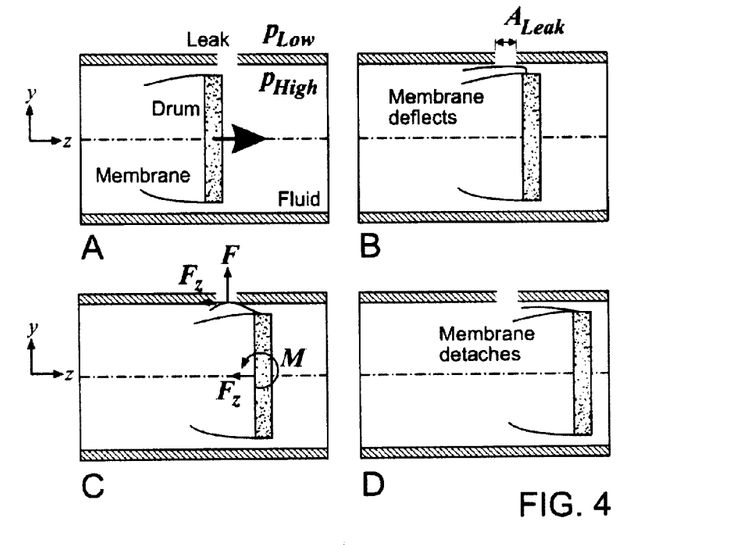

A schematic of the proposed detection concept is shown in FIG. 4. To achieve full observability around the circumference a circular membrane is utilized. The membrane is moving close to the pipe walls at all times conforming to diameter changes and other defects on the walls, e.g. accumulated scale. The membrane is suspended by a rigid body, called a drum (FIG. 4 [a]). The drum is allowed to rotate about its center point G (about any axis) by design. The latter is allowed by a gimbal.

In case of a leak the membrane is pulled towards it. This happens because the membrane is pulled by the radial drop in pressure $\partial p/\partial r$ described earlier (FIG. 4 [b]). Upon touching the walls, pressure difference $\Delta p$ is creating the normal force F on the membrane. We can write that:

$$F = \Delta p A_{Leak} \quad (1)$$

where $A_{Leak}$ stands for the cross-sectional area of the leak, which can be of any shape.

As PipeGuard continues traveling along the pipe, a new force is generated ($F_z$). This force is a result of friction between the membrane and the pipe walls. $F_z$ is related to the normal force, F, by an appropriate friction model, say $F_z = g(F)$. The analytic form of function g is not discussed in this patent application. By using Eq. (1) we can see that $F_z$ depends on the pressure difference, since $F_z = g(\Delta p A_{Leak})$.

Then $F_z$ generates an equivalent force and torque on the drum, M, a key fact that is discussed further below. As a result, M pushes the drum to rotate about some axis passing through its center, while orientation of the axis depends on the angle φ of the leak around the circumference (FIG. 4 [c]). The effects of M can be later sensed by force and/or displacement sensors mounted on the detector. $F_z$ vanishes only when the membrane detaches from the leak and the drum bounces back to the neutral position (FIG. 4 [d]).

We now describe the detailed design of a mechanism that uses the concept presented here to effectively identify leaks in pipes. The disclosed system can identify a leak by measuring forces on the drum. Essentially, the problem has switched from identifying a radial pressure gradient (at any angle φ), to measuring forces (and/or deflections) on a mechanism.

Figure 5:
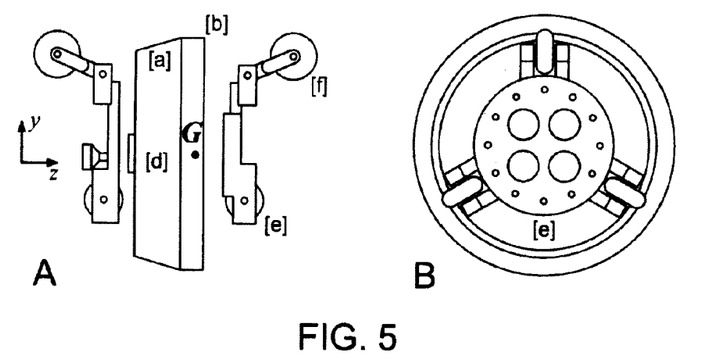
Figure 6:
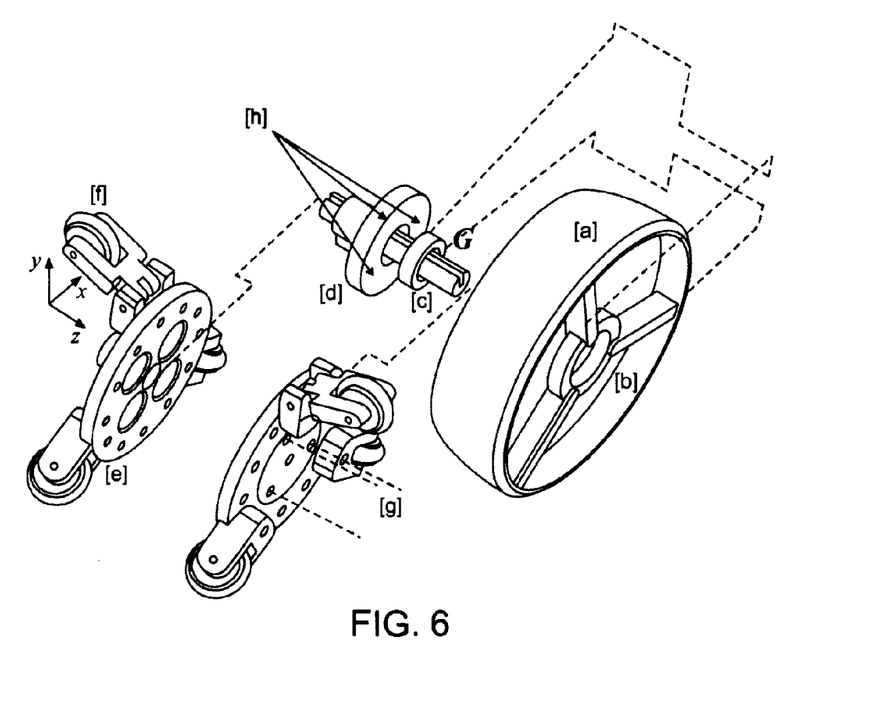

A 3D solid model of the disclosed detector is shown in FIG. 5. The exploded view of the design is presented in FIG. 6. The drum is suspended by a wheeled system and remains always in the middle of the pipe. A key fact with this design is the gimbal mechanism consisting of two different parts (parts [b] and [c] in FIG. 6). This mechanism allows the drum to pivot about two axes and thus respond to any torque, M, about any axis passing through its center point G. Moreover, the system dimensions are such that the membrane leaves a small clearance (<2 mm) from the walls of the pipe.

Whenever a leak exists, a torque M is generated about some axis on the drum depending on the leak angle φ, as described earlier. M is sensed by appropriate sensors on the back plate on the carrier. Very small motions on the drum are allowed in this specific embodiment. Springs (not shown) are used in order to push the drum back to the neutral position after detection is completed (FIG. 4 [d]. In this embodiment three linear springs are used and they are omitted in all figures for simplicity.

We now present the forces acting on the drum and justify the placement of sensors on the detector. In addition we propose a detection algorithm for effective leak detection and identification.

We discussed earlier that a force $F_z = F_z \hat{e}_z$ is generated at leak positions. Here we use $\hat{e}_z$ to represent the unit vector along axis z and similar notation will be followed. This force is then generating a torque about point G, the center of the gimbal mechanism, which is equal to:

$$M = F_z R \hat{e}_\phi \quad (2)$$
$$= F_z R(\cos\phi \hat{e}_y - \sin\phi \hat{e}_x)$$

Figure 7:
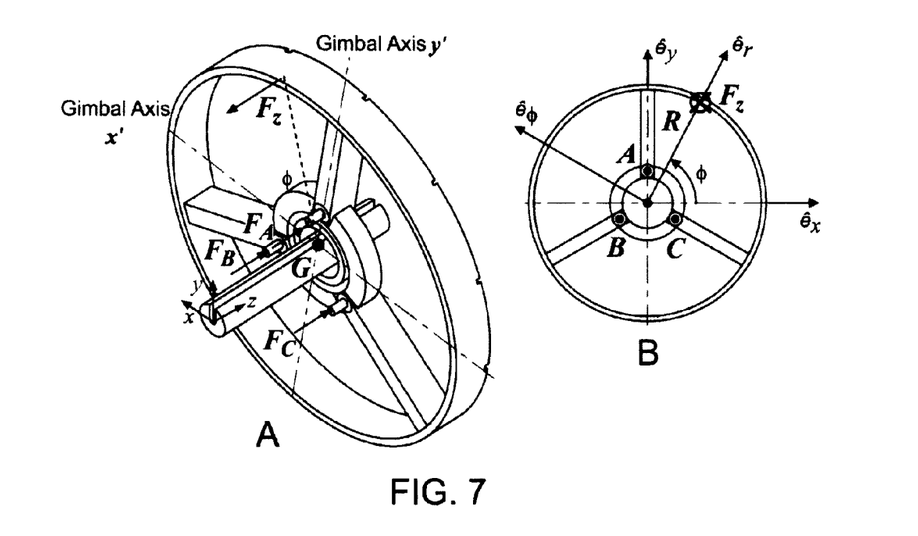

The drum is supported by three points, namely point A, B and C (FIG. 7). The distance between each of these points and the center of the gimbal G is the same and equal to r. We mention at this point that three points of support is the minimal support that is needed to fix the gimbal mechanism in position in such a design. In addition, those points are $2\pi/3$ away from each other.

We need to mention at this point that the three points do not contribute to the support of the drum at the neutral position. When the drum tends to move from neutral position each support creates a corresponding normal force ($F_A$, $F_B$, $F_C$) to counterbalance torque M stemming from $F_z$. We can write:

$$M_x = [F_A r - (F_B + F_C) r \sin(\pi/6)] \hat{e}_x \quad (3)$$

$$M_y = [F_B - F_C] r \cos(\pi/6)] \hat{e}_y \quad (4)$$

And the total support torque is equal to:

$$M_{support} = M_x + M_y \quad (5)$$

We assume here that the drum is only allowed to perform small movements and, thus, static analysis is accurate to first order. To complete the analysis we need to equilibrate the torques and forces acting on it. To do this we need to set $M_{support}$=M, using Eq. (2,5,3,4).

In addition, since the drum is only allowed to move very little, we can assume that $F_z$ is balanced by the support provided by the axes of the gimbal at point G. Then the sum of the three support forces discussed here is approximately equal to zero:

$$F_A + F_B + F_C = 0 \quad (6)$$

One can solve the system of equations for the three unknown support forces. Solution to system of equations yields:

$$F_A = \frac{-2R\sin\phi}{3r} F_z \hat{e}_z \quad (7)$$

$$F_B = 2R \frac{\sin\phi + \sqrt{3}\cos\phi}{6r} F_z \hat{e}_z \quad (8)$$

$$F_C = 2R \frac{\sin\phi - \sqrt{3}\cos\phi}{6r} F_z \hat{e}_z \quad (9)$$

For the purpose of this work we built a prototype that has the following dimensions:
R=47 mm
r=12.5 mm
and the detector is designed to operate in 100 mm as discussed later.

By installing two force sensors on the supports we are able to measure the corresponding forces directly. The idea here is to measure the support forces as a results of the leak force $F_z$, instead of measuring the leak pressure gradient directly.

To avoid "blind spots" and to be able to detect leaks at any angle around the circumference the system needs to perform at least two force measurements. The latter statement needs to be proven via observability analysis, which is outside the scope of this application. However, one can think of the simple case of a single leak at φ=0°. In such case a force sensor installed on point A would not give any measurement ($F_A$=0). However, another sensor placed on either point B or C can measure forces due to the leak and can eventually identify it.

In this embodiment we install force sensors on points B and C without loss of generality. In addition we propose the use of the following metric in order to effectively trigger alarms in case of leaks:

$$J(t,T) = \int_{t-T}^{t} \sqrt{F_B(\tau)^2 + F_C(\tau)^2} d\tau \quad (10)$$

where T is the integration period. Whenever J(t, T)>c, where c is a predefined constant, a leak is identified. c needs to be selected in such a way to neglect noise and avoid false alarms. At the same time large values of c will lower the sensitivity of the detection. This metric proves to be effective in identifying leaks in pipes as shown below where we present experimental results.

In order to validate the concepts we developed a prototype that will now be discussed. PipeGuard is evaluated in a real gas pipe. Details of the experiments and results are shown below.

For this work PipeGuard is designed to operate in 4" (100 mm) ID gas pipes. However, all concepts discussed herein can be scaled and slightly altered accordingly to accommodate pipes of different sizes and perform leak inspection in other fluid media, e.g. water, oil, etc.

Figure 8:
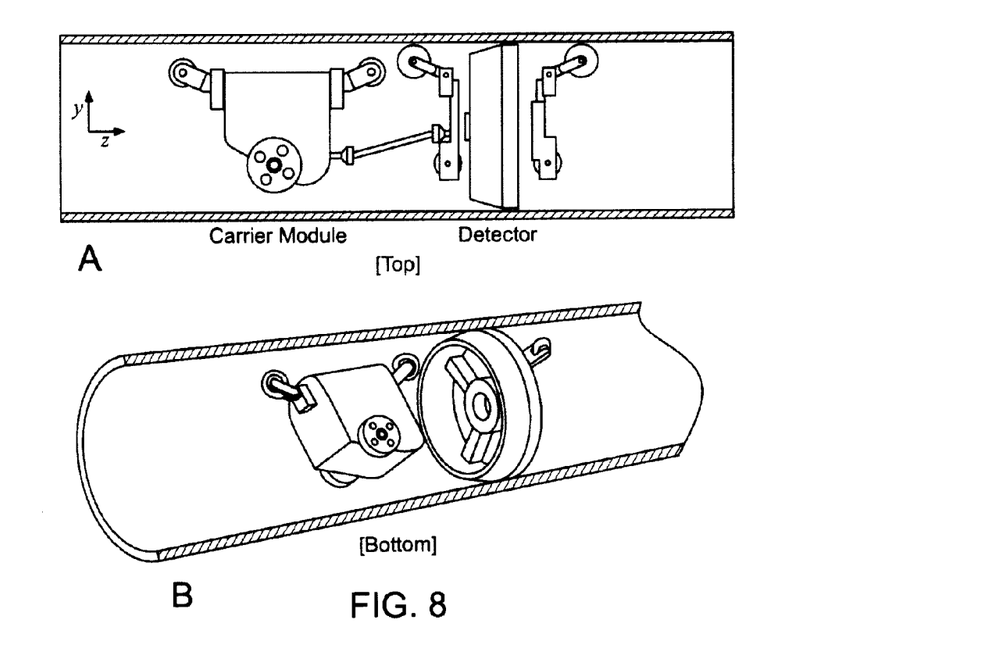

In this embodiment PipeGuard consists of two modules, namely the carrier and the detector (FIG. 8). The detector design and concepts have been discussed in detail earlier.

Figure 9:
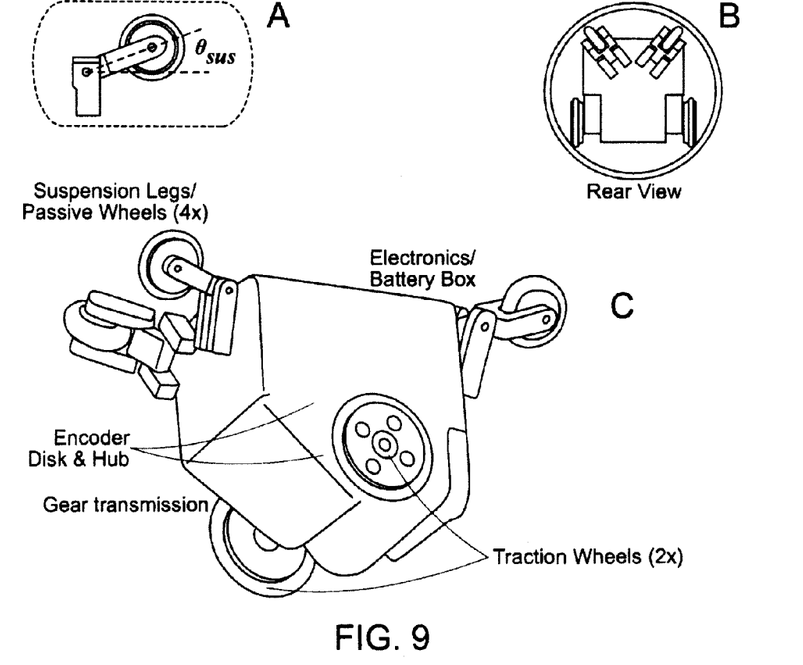

The carrier assures the locomotion of the system inside the pipe. The module is carrying actuators, sensors, power and also electronics for signal processing and communications. A 3D solid model of the carrier with explanations on its main subsystems is presented in FIG. 9.

The module's locomotion is provided via a pair of traction wheels (OD=1 3/16") (FIG. 9). Those two wheels are touching the lower end of the wall. In addition, the system is suspended by 4 legs with passive wheels from the upper walls as shown in the same figure.

Each suspension wheel has a spring loaded pivot. The angle $\theta_{sus}$ of each pivot point on each suspension wheel is regulated in a passive way and is providing required compliance to the carrier. That compliance is very important, since it enables the module to align itself properly inside the pipe, overcome misalignments or defects on the pipe walls or even comply with small changes in the pipe diameter.

The main actuator of the module is a 20 W brushed DC Motor from "Maxon" (339150). The motor is connected to the traction wheels via a set of gears with ratio 5:1. In order to regulate speed, an incremental rotary encoder (50 counts) from "US Digital" is used and the speed loop is closed. Both disk and hub are shown in FIG. 9. Finally, all electronics, communication modules and batteries are stored inside the carrier module.

Derived from our design requirements, the robot should be able to perform the following tasks:

Move and regulate speed in pipes

Identify leaks by measuring signals from two force sensors at relatively high sampling rates ($f_s$>150 Hz).

Communicate with the Command Center wirelessly

Figure 10:
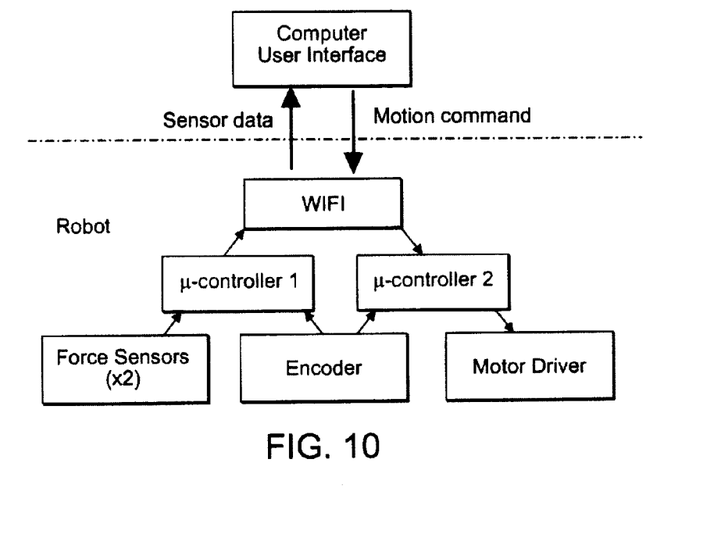
FIG. 10 is a block diagram showing a high level system architecture of an embodiment of the leak detector disclosed herein.

PipeGuard's architecture is developed to meet these requirements and is shown in FIG. 10. To perform the aforementioned tasks two micro-controllers are used. Micro-controller #1 is dedicated to speed regulation and micro-controller #2 is performing real-time leak sensing.

The workflow is the following: The user specifies a motion command on the computer. The computer sends out the motion command including desired speed and desired position to PipeGuard. After the WiFi transceiver on the robot receives the command, it delivers the command to micro-controller #2. Micro-controller #2 performs closed loop speed control in order to regulate speed of the carrier. At the same time it calculates speed (by measuring the signal from the encoder) and commands the system to stop if it reaches the end of the pipe section (or any other point along the pipe as specified by the operator).

Parallel to micro-controller #2, micro-controller #1 is responsible for leak detection and for sending out sensor data to the WiFi transceiver. This micro-controller receives signals from the two force sensors installed on the detector. At the same time it receives the measured position from the encoder mounted on the carrier. It compiles the correlating force sensor data with position data and sends them out through the WiFi transceiver. The WiFi receiver on the command center then receives the data, decomposes them and supplies them to the user via the graphical user interface on the computer.

In this embodiment of PipeGuard, the WiFi transceiver selected is an Xbee Pro 900 MHz RP module. We use two Arduino Pro Mini 328 5V/16 MHz and the motor driver used is the VNH5019 from Polulu. The whole system is powered by a 11 0.1 V 350 mAh 65 C Li-polymer battery. Finally, we use two FSR 400 force sensors for leak detection from "Interlink Electronics". The latter ones are powered at 5V and a resistor of 8 kΩ is used for the necessary voltage division.

We now evaluate PipeGuard in an experimental setup we built in our lab. The setup consists of a straight 4" ID and 1.40 m long PVC pipe. The system is deployed in the pipe and performs leak detection in a pressurized gas environment. Artificial leaks have been created on the pipe walls in the shape of circular 2 mm openings. Those openings can be considered small for the general case and such small leaks fail to be detected by most state-of-the-art systems available.

Figure 11:
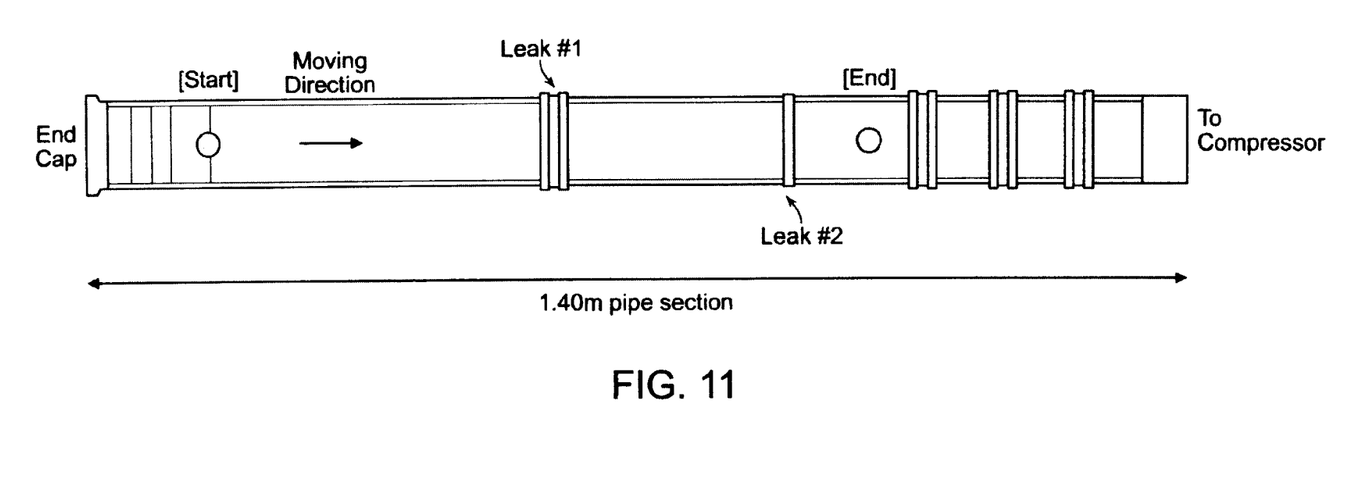
FIG. 11 is a photograph of the experimental setup used to evaluate an embodiment of the leak detection apparatus disclosed herein.

A picture of PipeGuard inside the experimental setup is shown in FIG. 11. PipeGuard moves along the pipe from [Start] to [End] and its job is to identify the leaks. In FIG. 11 leak #1 is covered and leak #2 is opened.

Figure 12:
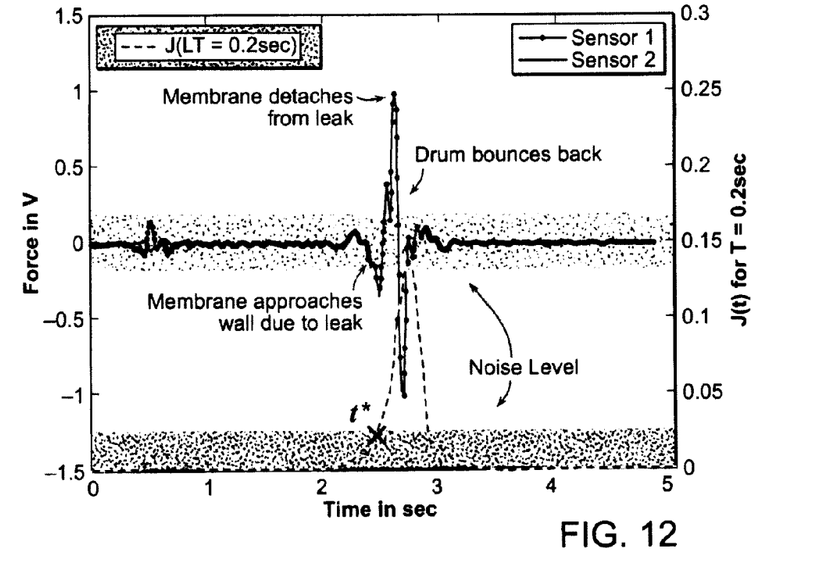
FIG. 12 is a graph of force against time showing sensor signals as the leak detector disclosed herein moves along a pipe.

Initially we let the system run in the pipe at low speeds. We command PipeGuard to move at $\omega_d$=2 $H_z$. which is equivalent to $v_d$=0.19 m/s. At this speed the system is able to traverse the distance from [Start] to [End] in approximately 5 sec. The signals captured by the two force sensors are shown in FIG. 12. A clear change in the signals reveals the existence of a leak in the pipe. Note here that for this experiment the line pressure was selected to be equal to 15 psi. In the same figure the evolution of the proposed metric from Eq. 10 is shown. A clear peak above the noise level is indicating the existence of a leak at t=t* when J(t*, T=0.2 sec)>0.025.

As PipeGuard approaches the leak, the signals from the two force sensors do not show any large variations from the DC value. Noise can occur but is much smaller in amplitude than the leak signal (FIG. 12). Detection occurs in four phases. Initially PipeGuard approaches the leak. Then the membrane is moving towards the leak because of the effect of the radial pressure gradient. The latter small movement results in a small change in the signals (undershoot in this case). Afterwards and when the membrane touches the wall at the leak position a force $F_z$ is generated, resulting in the torque M on the drum. The latter torque pushes the drum to move and thus signals of the two sensors change significantly. Signals continue to increase up to a certain point when the membrane detaches from the leak. At this point the drum bounces back to the neutral position and signals return to their dc values.

Successful detection is performed when both leaks along the pipe are opened. Again PipeGuard is commanded to move at $v_d$=0.19 m/s. The detector passes by the two consecutive leaks and the signals captured are presented in FIG. 13. Signal magnitude for leak #1 is smaller than the magnitude for leak #2. This is expected, as line pressure at the position of leak #1 is reduced, because of the existence of leak #2. By carefully selecting corresponding thresholds c, one can trigger alarms at times $t^*_i$ when $J(t^*_i,T)$>c. In this case, again, c=0.025 is selected in order to avoid false alarm (neglect noise) and effectively trigger alarms at leak locations.

Figure 13:
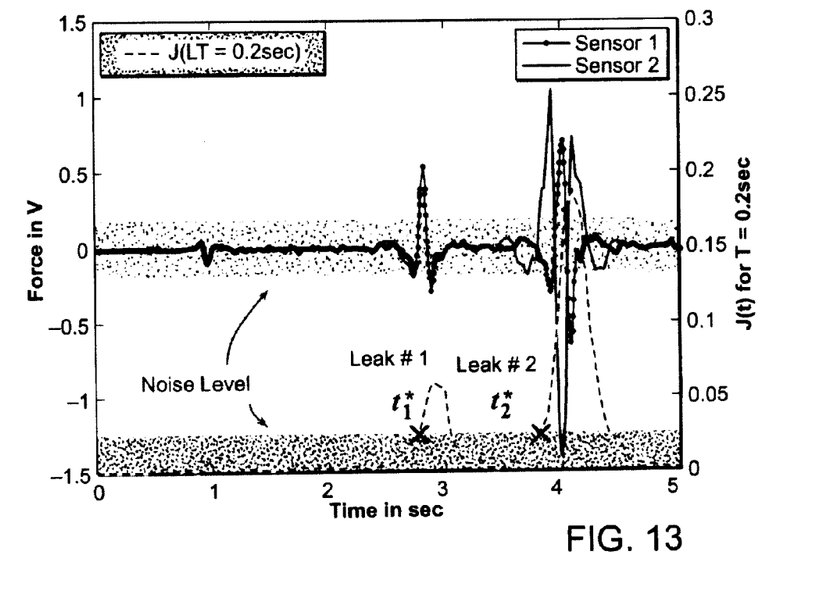
FIG. 13 is a graph of force versus time showing sensor signals as the leak detector moves along the pipe.

By carefully observing FIG. 13 we can see that signals captured as PipeGuard is passing by the first leak are in phase, while the signals at the second leak are out of phase. This occurs because the two leaks are at a different position on the circumference of the pipe ($\phi_1 \neq \phi_2$). By designing appropriate algorithms one can estimate the position of the leak on the circumference, but such discussion is outside the scope of this application.

Figure 14:
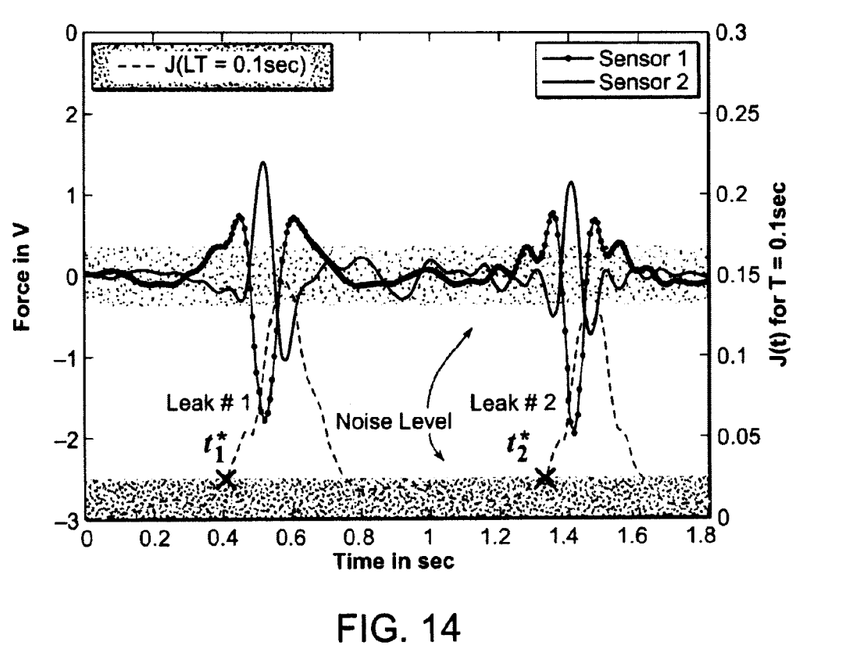
FIG. 14 is a graph of force versus time showing sensor signals as the leak detector apparatus moves along the pipe.

This specific version of PipeGuard is able to move inside the pipes at relatively high speeds. Experimentation showed that PipeGuard's motor is saturated at approximately $\omega_d$=9.23 $H_z$, which is equivalent to $v_d$=0.875 m/s. At this speed PipeGuard is able to inspect pipes at a rate of more than 3 km per hour. Even at these speeds PipeGuard is still able to inspect pipelines and detect leaks in a very reliable fashion. By carefully selecting the triggering thresholds one is able to trigger alarms only when leaks are present and avoid false alarms. Example leak signals captured at those high speeds are shown in FIG. 14. In this case noise magnitude is higher, but still leak signals stand out significantly. In this case c=0.025, but one would probably try to increase the threshold. The latter would enable the sensor to neglect higher noise levels at the cost of reducing the sensitivity of the detection.

The numbers in square brackets refer to the references listed herein. The contents of all of these references are incorporated herein by reference in their entirety.

It is recognized that modifications and variations of the present invention will be apparent to those of ordinary skill in the art, and it is intended that all such modifications and variations be included within the scope of the appended claims.

REFERENCES

[1] Mays L., 2000. *Water Distribution Systems Handbook*. McGraw-Hill
[2] Hunaidi O., Chu W., Wang A. and Guan W., 1999. "Leak detection method for plastic water distribution pipes". *Advancing The Science of Water. Fort Lauderdale Technology Transfer Conference, AWWA Research Foundation*, pp. 249-270.
[3] Fuchs H. V. and Riehle R., 1991. "Ten years of experience with leak detection by acoustic signal analysis". *Applied Acoustics*, 33, pp. 1-19.
[4] Hunaidi O. and Chu W., 1999. "Acoustical characteristics of leak signals in plastic water distribution pipes". *Applied Acoustics*, 58, pp. 235-254:
[5) Bracken M. and Hunaidi O., 2005. "Practical aspects of acoustical leak location on plastic and large diameter pipe". *Leakage* 2005 *Conference Proceedings* (448-452).
[6] Hunaidi O., Chu W., Wang A. and Guan W., 2000. "Detecting leaks in plastic pipes". *Journal American Water Works Association*, 92(2), pp. 82-94.
[71 Hunaidi O. and Giamou P., 1998. "Ground-penetrating radar for detection of leaks in buried plastic water distribution pipes". *Seventh International Conference on Ground Penetrating Radar* (*GPR* '98), pp. 783-786.
[8) Kurtz D. W., 2006. "Developments in a free-swimming acoustic leak detection system for water transmission pipelines". *ASCE Conf Proc.*, 25 (211).
[9] Bond A., Mergelas B. and Jones C., 2004. "Pinpointing leaks in water transmission mains". *ASCE Cotif. Proc.*, 91(146).
[10] Chatzigeorgiou D., Youcef-Toumi K., Khulifa A. and BenMansour R., 2011. "Analysis and design of an in-pipe system for water leak detection". *ASME International Design Engineering Technical Conferences & Design AutomationConference* (*IDETC/DAC*20 11).
[11] Khalifa A., Chatzigeorgiou D., Youcef-Toumi K., Khulief Y. and Ben-Mansour R., 2010. "Quantifying acoustic and pressure sensing for in-pipe leak detection". *ASME International Mechanical Engineering Congress & Exposition* (*IMECE*20/0).
[12] Chatzigeorgiou D., Khalifa A., Youcef-Toumi K. and Ben Mansour R., 2011. "An in-pipe leak detection sensor: Sensing capabilities and evaluation". *ASMEIJEEE International Conference on Mechatronic and Embedded Systems and Applications* (*MESA*2011).
[13] Choi H-R. and Roh S-G, 2005. "Differential-drive in-pipe robot for moving inside urban gas pipelines". *Transactions on Robotics*, 21(1).
[14] Schempf H., Mutschler E., Goltsberg V., Skoptsov G., Gavaert A. and Vradis G., 2003. "Explorer: Untethered real-time gas main assessment robot system". *Proc. of Int. Workshop on Advances in Service Robotics* (*ASER*).
[15] Mirats Tur, J. M., and Garthwaite, W., 20 I 0. "Robotic devices for water main in-pipe inspection: A survey". *Journal of Field Robotics*, 27(4), pp. 491-508.
[16] Wu D., Youcef-Toumi K., Mekon S. Ben Mansour R., 2013. "Relay node placement in wireless sensor networks for pipeline inspection". *IEEE American Control Conference* (*ACC*2013).
[17] Ben-Mansour R, M. A. Habib, A. Khalifa, K. Youcef-Toumi and D. Chatzigeorgiou, 2012. "A computational fluid dynamic simulation of small leaks in water pipelines for direct leak pressure transduction". *Computer and Fluids* (2011).

What is claimed is:

1. Leak detection apparatus for deployment in a pipe comprising;
   a carrier disposed for motion along the pipe;
   a detector connected to move within the carrier in an axial direction, the detector comprising;
   a drum mounted for rotation about pitch and yaw axes;
   flexible material mounted on, and extending from, the drum; and
   at least two sensors responsive to drum rotation;
   wherein the flexible material will be drawn into contact with a wall of the pipe at a leak location thereby producing a torque on the drum causing the drum to rotate and the at least two sensors to generate signals from which leak location is determined.

2. The leak detection apparatus of claim 1 further including a gimbal disposed between the carrier and the detector to allow for the drum rotation.

3. The leak detection apparatus of claim 1, wherein the flexible material is polyurethane.

* * * * *